Patented July 28, 1942  2,291,085

UNITED STATES PATENT OFFICE 2,291,085

TREATMENT OF WASHING WATER

Henry W. Lehmkuhl and Myron W. Cucci, Rochester, N. Y., assignors to Milk Plant Specialties Corporation, Rochester, N. Y., a corporation of New York No Drawing. Application January 23, 1941, Serial No. 375,643

9 Claims. (Cl. 210—23)

The present invention relates to the treatment of washing water, and is useful especially, but not exclusively, in the treatment of hard water intended for rinsing operations.

In the washing by machine of various articles, particularly food receptacles or utensils such as milk cans, the equipment used ordinarily provides for a washing operation, using hot alkaline wash water, followed by a rinsing operation, and finally a steaming operation. It is desirable that the rinse water be hot rather than cold, for better rinsing effect and for reduction of the amount of steam needed in the subsequent step. It is also desirable that it be slightly acid in reaction, for the purpose of neutralizing traces of alkalinity left from the washing water, and for impeding the growth of certain types of microorganisms which thrive best in a medium of alkaline reaction, such as proteolytic bacteria likely to be found in some milk cans, and also because an acid reaction of the water helps to prevent scale precipitation from the hot water.

These conditions are difficult of attainment, however, in case the water supply consists of hard water, particularly water having hardness due to calcium or magnesium bicarbonates. The bicarbonate hardness is not so serious an obstacle in the case of the water used in the main washing operation, as in the case of the water used in the rinsing operation, because alkaline detergent compounds capable of counteracting the bicarbonate hardness are available. Such compounds are not suitable for use with the rinse water, however, for they would make the rinse water alkaline, whereas it is preferable to have it slightly acid, as above stated. The usual scale-preventing or hard water treating substances also result in an alkaline reaction. Without some compound to counteract the hardness of the water, the heating of the water to make a hot rinse bath will drive off carbon dioxide from the water and produce an insoluble precipitate of calcium or magnesium salts which frequently forms an objectionable coating on the articles being washed, clogs the spray nozzles or other parts of the washing machine, and is otherwise harmful and undesirable. These objections have led to the practice, now quite prevalent, of using a cold rinse rather than the more desirable hot rinse, in situations where the water has bicarbonate hardness.

An object of the present invention is to overcome these difficulties and to provide a simple and inexpensive water treatment which enables the use of hard water for a hot rinsing bath of acid reaction.

Another object is to impart an acid reaction to a hot rinse water of alkaline hardness, so as to obviate scale formation and corrosion, and to render difficult the development of alkaline-loving organisms.

A further object is the provision of a treatment for water of alkaline hardness which will eliminate or greatly reduce the corrosive action of such water upon metal tanks or other metal parts in contact therewith.

These objects are attained, according to the present invention, by adding to the hard water which is to be used for the rinsing bath, gluconic acid and hydrogen dioxide. Gluconic acid is added in small quantities sufficient to produce an initial pH value of about 6.0 to 6.9, which value should be maintained closely during operation to prevent corrosion and to keep the solution acidic throughout the rinsing process.

The use of gluconic acid alone will not accomplish this, however, in the case of hard water having bicarbonate hardness. The heating of such water approximately to the boiling point drives off $CO_2$ thus gradually decreasing the available hydrogen ions and causing a gradual increase of the pH value, so that the water, originally having an acidic pH value of about 6.0 to 6.9 due to the addition of gluconic acid, soon becomes alkaline as heating is continued.

The addition of hydrogen dioxide, however, overcomes this tendency of the water to become alkaline upon heating, and keeps it of the desired slightly acid reaction. The action apparently, as at present understood, is that oxygen liberated by decomposition of the hydrogen dioxide causes a decomposition of the gluconic acid, the oxygen from the hydrogen dioxide combining with two atoms of hydrogen of the gluconic acid to form water, whereupon one of the carbon atoms of the gluconic acid splits off, with two of the oxygen atoms thereof, to form $CO_2$, which replaces the $CO_2$ driven off from the hard water by the heating of the water, thus maintaining the equilibrium and keeping the pH value approximately constant.

The decomosition of the gluconic acid by the hydrogen dioxide does not occur all at once, but proceeds gradually, and by adding proper amounts of gluconic acid and hydrogen dioxide, the reaction can be made to proceed at a rate which will produce $CO_2$ by decomposition of the gluconic acid, at approximately the same rate that $CO_2$ is lost from the bicarbonates in the water by the heating thereof. In this way the hard water can be heated to provide the desirable hot rinse rather than a cold rinse, and can still be maintained of the desirable acidity, notwithstanding the loss of $CO_2$ upon heating.

The decomposition of the gluconic acid results in arabinose and in small quantities of the lower aliphatic acids, but these are not objectionable in the quantities produced.

The gluconic acid and hydrogen dioxide may be added to a batch of the cold rinse water before it is heated, if it is to be used promptly after heating, for the reason that the decomposition reaction takes place readily in hot solution but not in a cold solution, so that the decomposition does not start to an appreciable extent until the water is heated. As additional hot rinse water is supplied to the rinse tank to make up for losses, further quantities of gluconic acid and hydrogen dioxide should be added in the proper proportion to the amount of water added. Any type of constant feed equipment may be used, preferably synchronized with the circulating pump of the rinse solution.

In the practical treatment of any given water supply intended for rinsing purposes, the degree of hardness and the pH value of the water are important considerations. The amounts of gluconic acid and of hydrogen dioxide may be varied as determined by tests made on the particular water to be treated, to establish the minimum amounts of these materials which are required to produce a clear solution and a constant pH value of about 6.0 to 6.9 after evaporation of a substantial part of the water by heat.

Amounts satisfactory for water having 20 grains of bicarbonate hardness per gallon are as follows: gluconic acid, 0.375 gram, and hydrogen dioxide 3% U. S. P., 10 cubic centimeters per liter of water. The same proportions may be expressed as gluconic acid 0.0375%, and hydrogen dioxide 0.03%, for water having 20 grains of hardness per gallon. Approximately half as much gluconic acid and hydrogen dioxide would be used for water having 10 grains of hardness, and proportionate amounts for other hardnesses.

It is advisable not to use the hydrogen dioxide in amounts in excess of that required to oxidize the gluconic acid at the proper rate, otherwise oxygen may be liberated to oxidize or corrode the metal parts of the washing machine.

The importance of the combination of gluconic acid with hydrogen dioxide is illustrated by the fact that when a solution of the above mentioned quantity of gluconic acid in water of the above mentioned hardness, but without the hydrogen dioxide, is evaporated by heat to one-half of its original volume, the water at the end of such evaporation will be distinctly alkaline rather than acid, whereas the same water with the same quantity of gluconic acid plus the above mentioned quantity of hydrogen dioxide, when evaporated by heat to one-half of its original volume, will have approximately the same pH value at the end of such evaporation as at the beginning, and will still be mildly acidic in reaction.

Comparative tests made with sheet steel plates immersed in water having bicarbonate hardness, show that the noticeable corrosion of such plates caused by untreated water is greatly reduced or practically eliminated when the water has been treated according to this invention.

We claim:

1. Washing water containing in solution gluconic acid and hydrogen dioxide in sufficient amounts substantially to counteract bicarbonate hardness originally present in said water.

2. Washing water originally having bicarbonate hardness and containing in solution added gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from said water by boiling.

3. Washing water originally having bicarbonate hardness and containing in solution added gluconic acid and hydrogen dioxide in approximately the proportions of 0.037% by weight of gluconic acid and 0.03% by weight of hydrogen dioxide for water having 20 grains of hardness per gallon, and proportionately more or less gluconic acid and hydrogen dioxide for water having more or less original hardness.

4. The method of treating water originally having bicarbonate hardness to render it more suitable for use as a hot rinse, which comprises the steps of adding gluconic acid and hydrogen dioxide to said water in sufficient amounts substantially to counteract the bicarbonate hardness originally present in said water.

5. The method of treating water originally having bicarbonate hardness to render it more suitable for use as a hot rinse, which comprises the steps of adding to said water gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from the water by boiling.

6. The method of treating water originally having bicarbonate hardness to render it more suitable for use as a hot rinse, which comprises the steps of adding to said water gluconic acid and hydrogen dioxide in approximately the proportions of 0.0375% by weight of gluconic acid and 0.03% by weight of hydrogen dioxide for water having 20 grains of hardness per gallon, and proportionately more or less gluconic acid and hydrogen dioxide for water having more or less original hardness.

7. The method of washing food containers with water originally having bicarbonate hardness which includes the steps of washing said containers with an alkaline solution of said hard water and then rinsing said containers with a hot acid solution of said water containing gluconic acid and hydrogen dioxide in sufficient amounts substantially to counteract the bicarbonate hardness originally present in said water.

8. The method of washing food containers with water originally having bicarbonate hardness which includes the steps of washing said containers with an alkaline solution of said hard water and then rinsing said containers with a hot quantity of said water containing in solution gluconic acid in an amount sufficient to give the water a pH value in the range of about 6.0 to 6.9 and hydrogen dioxide in an amount sufficient to cause decomposition of the gluconic acid at a rate to supply carbon dioxide from such decomposition approximately as fast as carbon dioxide is lost from said water by boiling.

9. The method of washing food containers with water originally having bicarbonate hardness which includes the steps of washing said containers with an alkaline solution of said hard water and then rinsing said containers with a hot quantity of said water containing gluconic acid and hydrogen dioxide in approximately the proportions of 0.0375% by weight of gluconic acid and 0.03% by weight of hydrogen dioxide for water having 20 grains of hardness per gallon.

HENRY W. LEHMKUHL.
MYRON W. CUCCI.